United States Patent [19]
Brodersen et al.

[11] Patent Number: 5,846,055
[45] Date of Patent: Dec. 8, 1998

[54] STRUCTURED SURFACES FOR TURBO-MACHINE PARTS

[75] Inventors: Sönke Brodersen, Schriesheim; Jürgen Schill, Weisenheim; Helmut Warth, Ludwigshafen, all of Germany

[73] Assignee: KSB Aktiengesellschaft, Frankenthal, Germany

[21] Appl. No.: 848,953

[22] Filed: Apr. 30, 1997

Related U.S. Application Data

[63] Continuation of Ser. No. 255,045, Jun. 7, 1994, abandoned.

[30] Foreign Application Priority Data

Jun. 15, 1993 [DE] Germany ................. P 43 19 628.4

[51] Int. Cl.$^6$ ................................................... F04D 29/44
[52] U.S. Cl. ..................... 415/206; 415/914; 416/236 R
[58] Field of Search .............................. 415/206, 914; 416/235, 236 R, 236 A

[56] References Cited

U.S. PATENT DOCUMENTS

| | | |
|---|---|---|
| 2,864,552 | 12/1958 | Anderson ................................. 415/71 |
| 2,990,107 | 6/1961 | Edwards ................................. 415/71 |
| 3,481,531 | 12/1969 | MacArthur . | |
| 4,720,239 | 1/1988 | Owczarek . | |
| 5,215,439 | 6/1993 | Jensen ................................. 416/236 R |

FOREIGN PATENT DOCUMENTS

| | | |
|---|---|---|
| 0620392 | 5/1961 | Canada ................................. 415/71 |
| 3528135 C2 | 8/1985 | Germany . |
| 3534293 A1 | 9/1985 | Germany . |
| 3609541 A1 | 3/1986 | Germany . |
| G 90 13 099.5 | 9/1990 | Germany . |
| 9039992 | 3/1984 | Japan ................................. 415/111 |
| 0234296 | 10/1986 | Japan ................................. 415/111 |
| 4148099 | 5/1992 | Japan ................................. 415/220 |
| 1059217 | 12/1983 | Russian Federation ........... 416/186 R |
| 1090916 | 5/1984 | Russian Federation ........... 416/186 R |
| 1677346 A1 | 2/1988 | Russian Federation . |

OTHER PUBLICATIONS

*Encyclopedia of Physics*, vol. XII, Thermodynamics of Gases, Published by Springer Verlag, Berlin, Gottingen, Heidelberg, 1958, pp. 562 and 563 (includes an English language translation).

Walsh, M.J.: Turbulent Boundary Layer Drag Reduction Using Riblets, AIAA–Paper 82–0169, 1982, S.1–8.

Walsh, M.J.: Lindemann, A.M.: Optimization and Application of Riblets for Turbulent Drag Reduction, AIAA–Paper 84–0347, 1984, S.1–10.

Private Industral document Dated Nov. 30, 1877 vol. 19, N 275 (Italy).

*Primary Examiner*—John T. Kwon
*Attorney, Agent, or Firm*—Darby & Darby

[57] ABSTRACT

A turbo-machine comprises a housing. The housing has internal surfaces which come into contact with fluid flowing through the turbo-machine. The surfaces have an ordered, fine, sharp-edged groove structure that is affixed to the surfaces, such that the groove structure extends predominantly in the flow direction.

21 Claims, 2 Drawing Sheets

STRUCTURED SURFACES FOR TURBO-MACHINE PARTS

This is a continuation of application Ser. No. 08/255,045, filed Jun. 7, 1994, now abandoned.

FIELD OF THE INVENTION

The present invention relates to a turbo-machine having surfaces which come into contact with the fluid flow. More specifically, the present invention relates to a turbo-machine having the fluid contacting surface roughened with a groove structure that extends predominantly in the flow direction.

BACKGROUND OF THE INVENTION

Parts of turbo-machines are produced by means of various known methods. The surfaces of these parts, which come into contact with the transport medium disposed inside the pump, have a certain surface roughness due to the manufacturing process. This roughness is a disadvantage from a hydraulic point of view because surface friction caused by these surfaces negatively affects the efficiency of such a unit. The power losses due to such surface friction can become very large, depending on the power of a particular turbo-machine. To reduce these power losses and to increase the overall efficiency of a pump, it is therefore customary to make the parts which come in contact with fluid as smooth as possible.

On the other hand, in the case of aircraft, it is known from the DE-PS 36 09 541, that straight, staggered ribs, disposed at a distance from one another, and protruding with respect to the surface, can be used. These type of ribs are produced by hot-rolling or casting from plastic films, so that they can then be attached to the aircraft surfaces. These ribs are designed to reduce the frictional resistance of the aircraft.

SUMMARY OF THE INVENTION

The basic problem of the invention is to improve the efficiency of turbo-machines by reducing the power losses. A solution to this problem is to affix a sharp-edged, fine groove structure on the surfaces which come into contact with the flowing liquid, such that the groove structure extends predominantly in the flow direction. By flow direction what is meant here is the resultant flow direction, which is composed of axial, radial, and tangential components. Such a structure is able to reduce surface friction sharply in the region of the individual surfaces of the structural parts of the turbo-machine. For this purpose, an embodiment of the invention provides that the groove cross section, defined by the groove width and the groove depth, is of the order of $\mu m^2$. These grooves preferably have a V-shaped or U-shaped cross section. The grooves make a major positive improvement in the region of the wheel sides of an impeller, of the housing sides, or inside a guide device traversed by liquid, or inside an impeller. Marked improvements also result from attaching the grooves to stationary housing surfaces over which liquid flows.

Embodiments of the present invention specify that the groove structure, including one or more grooves, has a spiral pattern. According to another embodiment, a groove structure has several grooves that are parallel or that diverge slightly in the flow direction. This measure makes it possible for the first time, within a turbo-machine, for example a radial centrifugal pump or a turbine, to minimize the losses occurring at surfaces which are exposed to a circulating liquid flow. This can be done in similar fashion, e.g., with the stationary housing wall surfaces or the rotating impeller wall surfaces. It is also possible to design the flow channels of guide wheel devices or of impellers in similar fashion, such that these channels also have a spiral course along their length.

In reference to the fabrication of this groove structure, other embodiments of the present invention specify that the groove structure is to be worked into the surfaces of the parts or that it is to be a component of a surface coating of the parts. This can be done by micro-machining the surface of the part or of the coating. However, it is also possible to attach films equipped with an appropriate groove structure inside stationary or rotating channels which are traversed by liquid.

Another embodiment of the present invention specifies that the groove structure is worked into a surface which is in contact with liquid or is worked into the surface of a molded part which creates the surface that is in contact with the liquid, in such a way as to characterize the surface. This surface can also be a coated one. Thus, in the case of machined impellers or housing-wall surfaces, it will be possible to process the surface with a lathe tool, which is capable of producing the micro-structure of the groove structure. This would also be possible with an appropriate lathe chisel on a lathe. The like could be done analogously in molding tools, by means of which an impeller or a housing wall surface is cast or injection molded. Every part of the turbo-machine, as this part comes out of the mold, would then be equipped with such a groove structure.

It is also possible to apply the groove structure to surfaces by electro-chemical ablation by means of electrodes shaped in accordance with the groove structure. It is also conceivable to produce the surface structure by so-called photo-resist etching methods such as are used in semiconductor manufacture to produce micro-circuits, or to process the surface by laser methods.

Advantageous dimensions of the groove structure, wherein a dimensionless groove spacing s+ and a dimensionless groove height h+ in the range from 5 to 25, with the ratio of the groove height to the groove spacing being less than or equal to one, are especially effective in reducing resistance.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENT INVENTION

Figure 1:
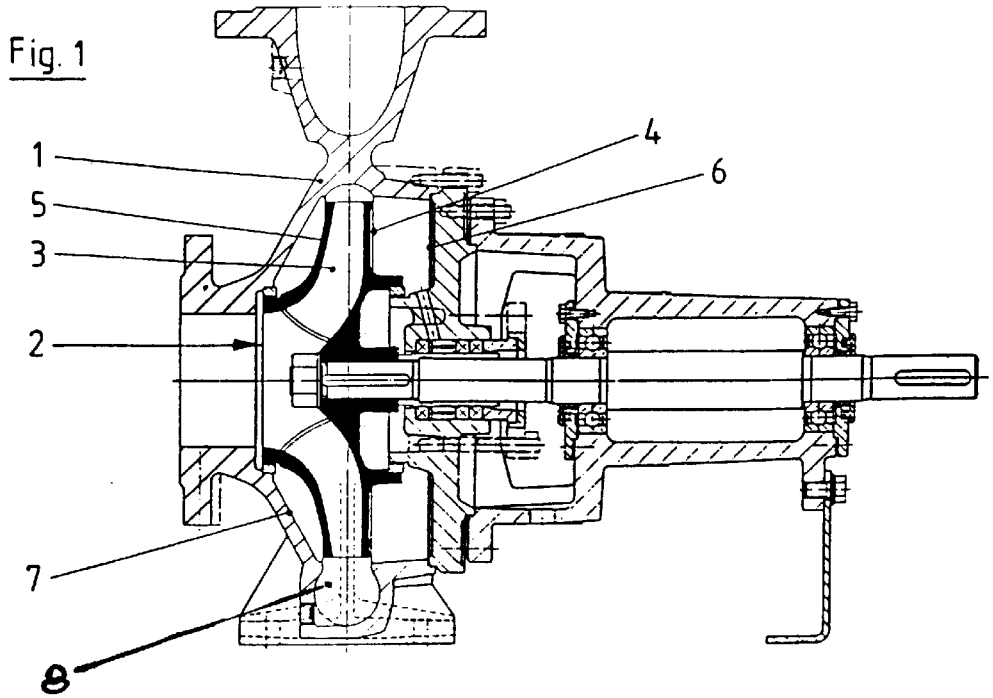
FIG. 1 shows a cross-section through a turbo-machine of a radial construction type.

Referring now to FIG. 1, a cross section through a turbo-machine of a radial construction type is illustrated. Depending on the flow direction, this turbo-machine can be, for example, a pump or a turbine. An impeller 2 having several blades 3 is disposed inside a housing 1. The blades 3 are disposed between a power-transferring main disk 4 and a cover disk 5. Stationary housing wall surfaces 6, 7 are disposed opposite the main disk 4 and the cover disk 5, respectively. The outside diameter of the impeller 2 can be surrounded by a guide device 8, which is designed as a spiral or as a guide wheel. The present invention is not limited to the radial form which is shown here by way of an illustrative example only, but the present invention can also be used in connection with other structural forms.

Figure 2:
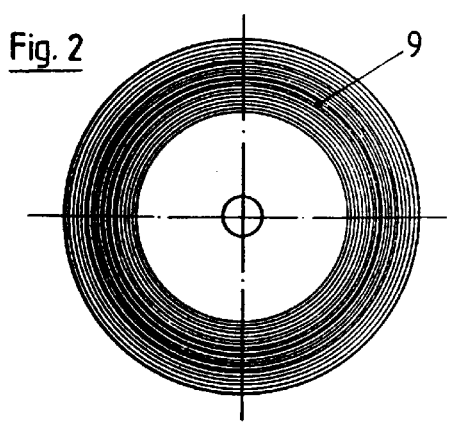
FIGS. 2–4 show a top view of an impeller wall or a housing side wall.

FIG. 2 shows a top view of a wall surface which has a groove structure 9. This wall surface can be part of the main disk 4, the cover disk 5, or a housing wall surface 6, 7; thus it can be either a rotating or a stationary wall surface. The groove structure applied to the wall surface has a dimensionless groove spacing $s^+$ of the order of $s^+=5-25$ and a dimensionless groove height $h^+$ of the same order. In other words, both s+ and h+ are preferably in the range from 5 to 25. Here $$s^+ = [(s \cdot U\infty)/\nu] \cdot \sqrt{(c_{f/2})}$$

where

| | | |
|---|---|---|
| $s$ | = | groove spacing (m) |
| $U_\infty$ | = | velocity of the free flow (m/sec) |
| $\nu$ | = | kinematic viscosity of the flow medium (m²/sec) |
| $c_f$ | = | local wall friction coefficient (./.) |

The like applies to the groove height $h^+$.

The grooves which form the groove structure here can have the form of a plurality of concentric circles; but the groove structure can also be formed by one or more helical grooves disposed in accordance with the relative motion of the fluid on the surface.

Figure 3:
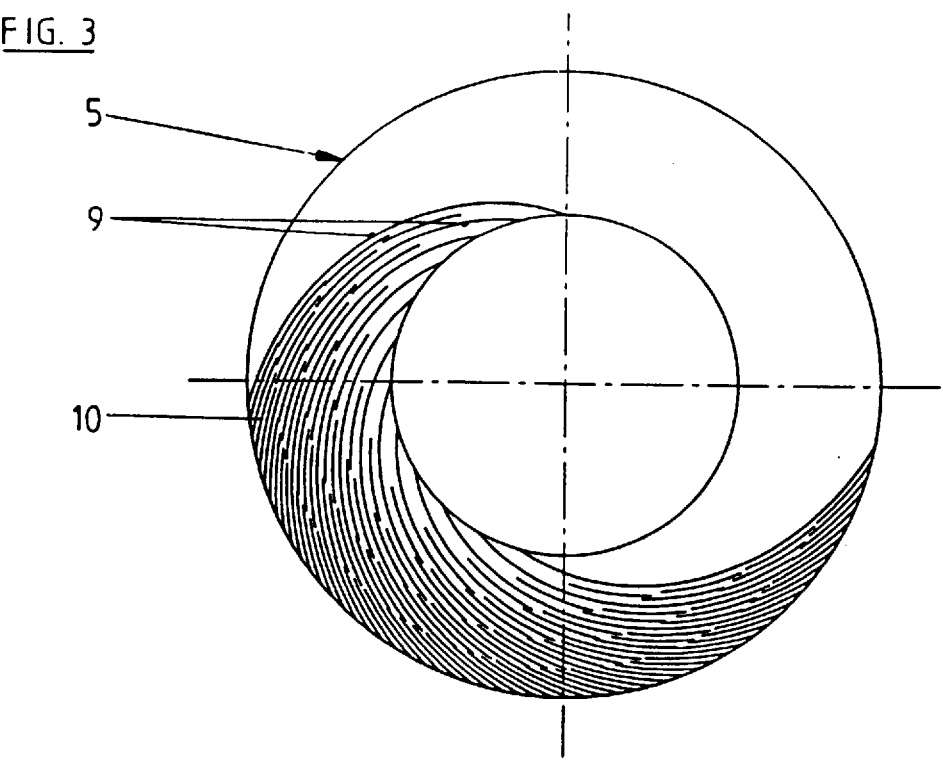
Figure 4:
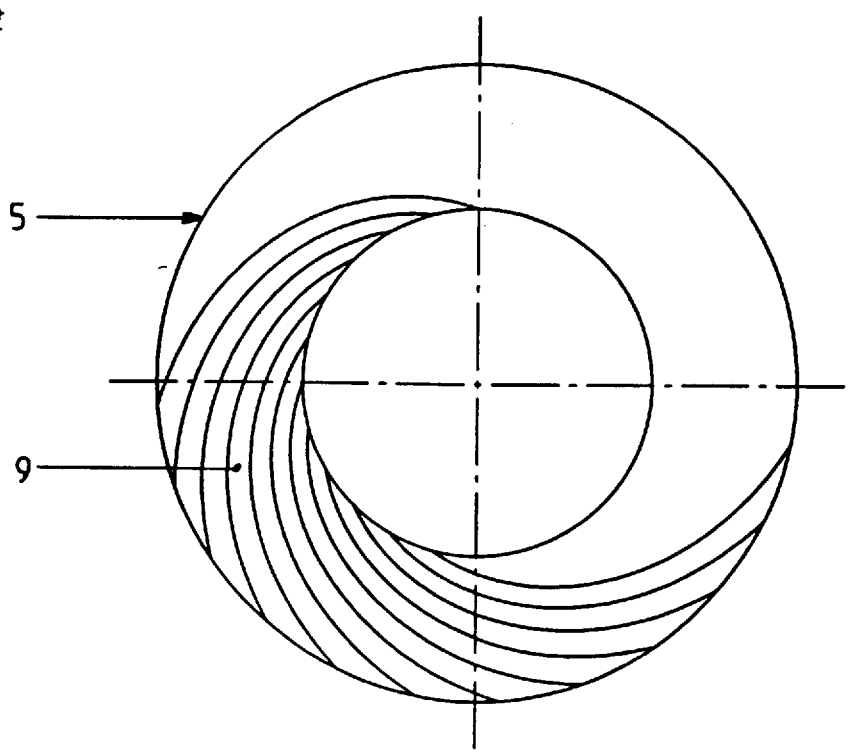

A variant of a groove structure on a stationary or, as here, on a rotating cover disk 5 of an impeller is shown by way of section in FIG. 3. This form is also advantageous for those wall surfaces on which a flow that needs to be influenced flows from the center to the perimeter. If the groove structure 9 runs in spirals from the center to the perimeter, the advantageous groove spacing of $s^+$ or of the groove height $h^+$ in the range from 5–25 can no longer be maintained after a certain radial extent. Consequently, beginning at an appropriate radial distance, additional, shorter grooves 10 are disposed between the continuous grooves of the groove structure 9. These shorter grooves 10 compensate for the increase of the spacing of grooves 9 due to the fanning-out process. Depending on the diameter of the surfaces which are being equipped with grooves, several groups with shorter grooves 10 can also be disposed at various radial distances. All the grooves advantageously extend in the direction of the main flow. However, grooves that are disposed concentrically or helically simplify the production process. By way of example, FIG. 4 shows a groove structure, likewise shown only in section, without additional short grooves 10. The groove spacing s here increases in the flow direction. The groove spacing s here must be such that the specified $s^+$ range is adhered to. The groove height h also increases correspondingly in the direction of the main flow.

Figure 5:
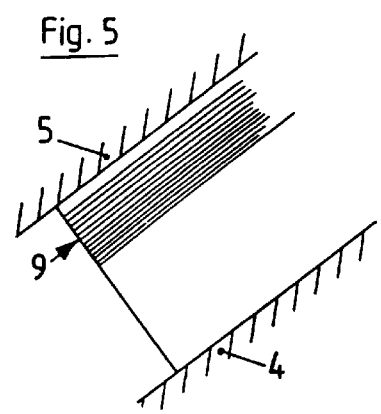
FIG. 5 shows a top view of a layout of the suction edge of a blade with liquid flowing around it.

FIG. 5 shows, again by way of section, a groove structure 9 on a blade which can be used either as an impeller blade 3 or as a blade of a guide device, which is not shown in this figure. Of course, it is preferred that the groove structure 9 is also applied to those wall surfaces to which the blades 3 are fastened and which form flow channels enclosed by the blades 3.

Figure 6:
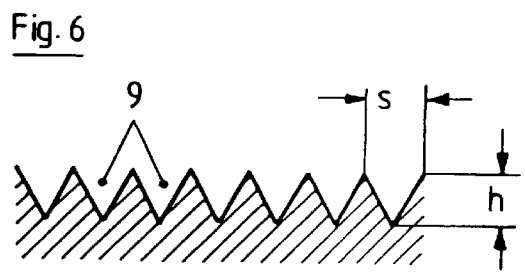
FIG. 6 and 7 show magnified cross-sections through various groove-structure surfaces.
Figure 7:
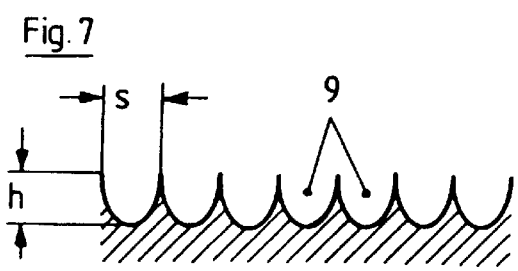

FIGS. 6 and 7 show various cross-sectional shapes of groove structures 9 or of grooves 10. The groove structure form shown here corresponds to a section perpendicular to the course of a groove structure 9. FIG. 6 shows a V-shaped groove cross-section, while, according to FIG. 7, an essentially U-shaped groove section can also be used. The groove structure must be produced in accordance with the measures described above. The dimensions h and s, which are drawn in to specify the size of the groove structure, here have dimensional units. These dimensions can be determined by means of the above equation, in accordance with the flow conditions in the respective machine.

From the foregoing description, it will be appreciated that the present invention makes available, a compact, cost efficient turbo-machine having a fluid contacting surface roughened with a groove structure that extends predominantly in the flow direction.

Having described the presently preferred exemplary embodiment of a new and improved turbo-machine having a fluid contacting surface roughened with a groove structure that extends predominantly in the flow direction in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

We claim:

1. A turbo-machine comprising:
   a housing;
   an impeller disposed within said housing, one of said housing and said impeller having an internal surface which comes into contact with liquid flowing through said turbo-machine, said surface having an ordered, fine, sharp-edged groove structure being affixed to said surface, said groove structure extending predominantly in the flow direction, the groove cross-section being defined by a groove width and a groove height which are of the order of $\mu m^2$;
   wherein a dimensionless groove spacing s+ is defined such that $$s^+ = [(s \cdot U\infty)/\nu] \cdot \sqrt{(c_{f/2})}$$

where

| | | |
|---|---|---|
| $s$ | = | groove spacing (m) |
| $U_\infty$ | = | velocity of the free flow (m/sec) |
| $\nu$ | = | kinematic viscosity of the flow medium (m²/sec) |
| $c_f$ | = | local wall friction coefficient. |

2. The turbo-machine of claim 1, wherein the groove structure includes at least one groove having a spiral pattern.

3. The turbo-machine of claim 2, wherein the groove structure includes a plurality of grooves that are parallel to one another.

4. The turbo-machine of claim 2, wherein the groove structure includes a plurality of grooves that diverge slightly in the flow direction.

5. The turbo-machine of claim 3, wherein the groove structure is worked into the surface.

6. The turbo-machine of claim 3, wherein the groove structure is part of a surface coating.

7. The turbo-machine of claim 5, wherein the groove structure is worked into a surface that comes in contact with said liquid.

8. The turbo-machine of claim 1, wherein a dimensionless groove spacing and a dimensionless groove height are in the range of 5 to 25.

9. The turbo-machine of claim 8, wherein the ratio of the groove height to the groove spacing is less than or equal to 1.

10. The turbo-machine of claim 8, wherein a dimensionless groove height h+ is defined such that $$h^+ = [(h \cdot U\infty)/\nu] \cdot \sqrt{(c_{f/2})}$$

where

| | | |
|---|---|---|
| $h$ | = | groove height (m) |
| $U_\infty$ | = | velocity of the free flow (m/sec) |
| $\nu$ | = | kinematic viscosity of the flow medium (m²/sec) |
| $c_f$ | = | local wall friction coefficient. |

11. The turbo-machine of claim 1, wherein a dimensionless groove height h+ is defined such that $$h^+ = [(h \cdot U\infty)/\nu] \cdot \sqrt{(c_{f/2})}$$

where

| | | |
|---|---|---|
| $h$ | = | groove height (m) |
| $U_\infty$ | = | velocity of the free flow (m/sec) |
| $\nu$ | = | kinematic viscosity of the flow medium (m²/sec) |
| $c_f$ | = | local wall friction coefficient. |

12. A turbo-machine comprising:

a housing;

an impeller disposed within said housing, one of said housing and said impeller having an internal surface which comes into contact with liquid flowing through said turbo-machine, said surface having an ordered, fine, sharp-edged groove structure being affixed to said surface, said groove structure extending predominantly in the flow direction, the groove cross-section being defined by a groove width and a groove height which are of the order of $\mu m^2$;

wherein a dimensionless groove height h+ is defined such that $$h^+ = [(h \cdot U\infty)/\nu] \cdot \sqrt{(c_{f/2})}$$

where

| | | |
|---|---|---|
| $h$ | = | groove height (m) |
| $U_\infty$ | = | velocity of the free flow (m/sec) |
| $\nu$ | = | kinematic viscosity of the flow medium (m²/sec) |
| $c_f$ | = | local wall friction coefficient. |

13. The turbo-machine of claim 12, wherein the groove cross-section is defined by a groove width and a groove height which are of the order of $\mu m^2$.

14. The turbo-machine of claim 12, wherein the groove structure includes at least of one groove having a spiral pattern.

15. The turbo-machine of claim 14, wherein the groove structure includes a plurality of grooves that are parallel to one another.

16. The turbo-machine of claim 14, wherein the groove structure includes a plurality of grooves that diverge slightly in the flow direction.

17. The turbo-machine of claim 15, wherein the groove structure is worked into the surfaces.

18. The turbo-machine of claim 15, wherein the groove structure is part of a surface coating.

19. The turbo-machine of claim 17, wherein the groove structure is worked into a surface that comes in contact with liquid.

20. The turbo-machine of claim 12, wherein a dimensionless groove spacing and a dimensionless groove height are in the range of 5 to 25.

21. The turbo-machine of claim 20, wherein the ratio of the groove height to the groove spacing is less than or equal to 1.

* * * * *